United States Patent
Phan

(10) Patent No.: US 7,813,146 B1
(45) Date of Patent: Oct. 12, 2010

(54) METHOD AND SYSTEM FOR POWERING MULTIPLE COMPUTER PLATFORMS

(75) Inventor: Manhtien Phan, Morgan Hill, CA (US)

(73) Assignee: Super Micro Computer, Inc., San Jose, CA (US)

( * ) Notice: Subject to any disclaimer, the term of this patent is extended or adjusted under 35 U.S.C. 154(b) by 271 days.

(21) Appl. No.: 11/548,694

(22) Filed: Oct. 11, 2006

Related U.S. Application Data

(60) Provisional application No. 60/826,935, filed on Sep. 26, 2006.

(51) Int. Cl.
*H02B 1/20* (2006.01)

(52) U.S. Cl. .................. 361/826; 361/794; 361/792

(58) Field of Classification Search .................. 361/760, 361/794, 792, 748, 741; 439/928, 502
See application file for complete search history.

(56) References Cited

U.S. PATENT DOCUMENTS

| | | | | |
|---|---|---|---|---|
| 566,557 | A * | 8/1896 | Cassidy et al. ......... | 128/201.23 |
| 5,507,650 | A * | 4/1996 | Larabell .................. | 439/61 |
| 5,564,024 | A * | 10/1996 | Pemberton .................. | 710/302 |
| 5,668,417 | A * | 9/1997 | Wiscombe et al. ........... | 307/64 |
| 6,098,127 | A * | 8/2000 | Kwang .................... | 710/62 |
| 6,525,926 | B1 * | 2/2003 | Chen ...................... | 361/683 |
| 6,659,803 | B1 * | 12/2003 | Chen ...................... | 439/638 |
| 6,669,513 | B2 * | 12/2003 | Huang .................... | 439/638 |
| 7,279,634 | B1 * | 10/2007 | Chang .................... | 174/50.5 |
| 7,401,239 | B2 * | 7/2008 | Chan et al. ............... | 713/300 |
| 2005/0041389 | A1 * | 2/2005 | Martin et al. ............. | 361/685 |
| 2007/0081308 | A1 * | 4/2007 | Ishida .................... | 361/724 |

* cited by examiner

*Primary Examiner*—Hung S Bui
(74) *Attorney, Agent, or Firm*—Joe Zheng; Wuxi Sino IP Agency, Ltd.

(57) ABSTRACT

Techniques pertaining to powering multiple platforms with a minimum impact on air passage in a predefined environment are disclosed. Instead of connecting each of the platforms in a chassis to a power supply therein, the present invention uses what is referred to as cascading powering to power all platforms within minimum cable delivery. According to one embodiment of the present invention, each platform is provided with a pair of power connectors. At least one of the platforms has a power connector located towards or near a power supply so that only a short cable is needed to power the platform. The power is serially provided to an adjacent platform via a pair of corresponding connectors, each located on one of the two adjacent platforms. Such configuration is extended to the remaining platforms. As a result, all platforms are powered by the same power supply without using individual cables directly to the power supply.

15 Claims, 5 Drawing Sheets

METHOD AND SYSTEM FOR POWERING MULTIPLE COMPUTER PLATFORMS

CROSS-REFERENCE TO RELATED APPLICATION

This application claims the benefits of the provisional application, No. 60/826,935, entitled "Method and system for powering multiple computer platforms", filed Sep. 26, 2006, which is hereby incorporated by reference for all purposes.

BACKGROUND OF THE INVENTION

1. Field of the Invention

The present invention generally relates to the area of powering computing systems, and more particularly, relates to techniques for powering multiple computer platforms or boards in a predefined housing with a minimum impact on the air passage therein.

2. Description of the Related Art

Mountable chassis are often used to house computer boards. Each chassis functions independently and therefore includes at least one platform or board and one power supply. FIG. 1 shows an exemplary way commonly used to power a single platform 102 in a chassis 100. The platform 102 is powered by a power supply 104 through a multiple-pin cable 106. As shown in FIG. 1, a connector for receiving the cable 106 on the platform 102 is often located near the power supply 104 so that the cable delivery (e.g., the cable length) is short.

The Industry standard of power delivery uses one or more ATX or extended ATX power supplies with a 20 or 24 pin cable to power a single computer platform. In one standard, a 20-pin and a 24-pin cable are defined respectively as follows:

| Pin | Definition |
|---|---|
| Standard 20-pin definition: | |
| 1 | no connected |
| 2 | no connected |
| 3 | GROUND |
| 4 | GROUND |
| 5 | GROUND |
| 6 | GROUND |
| 7 | 12 V |
| 8 | 12 V |
| 9 | 12 V |
| 10 | 12 V |
| 11 | PSON# |
| 12 | 5 V STBY |
| 13 | GROUND |
| 14 | GROUND |
| 15 | GROUND |
| 16 | GROUND |
| 17 | 12 V |
| 18 | 12 V |
| 19 | 12 V |
| 20 | 12 V |
| Standard 24-pin definition: | |
| 1 | 3.3 V |
| 2 | 3.3 V |
| 3 | GROUND |
| 4 | 5 V |
| 5 | GROUND |
| 6 | 5 V |
| 7 | GROUND |
| 8 | POWER GOOD |
| 9 | 5 V STANDBY |
| 10 | 12 V |
| 11 | 12 V |
| 12 | 3.3 V |
| 13 | 3.3 V |
| 14 | -12 V |
| 15 | GROUND |
| 16 | PSON# |
| 17 | GROUND |
| 18 | GROUND |
| 19 | GROUND |
| 20 | -5 |
| 21 | 5 V |
| 22 | 5 V |
| 23 | 5 V |
| 24 | GROUND |

When there is a need to have multiple platforms in a chassis, a traditional way is to have the power supply in the chassis to power these platforms in parallel. FIG. 2 shows one exemplary way commonly used to power two individual platforms 202 and 204 housed in a chassis 200. Both platforms 202 and 204 are powered by a power supply 206 via two separate cables 208 and 210. It may be appreciated that as the number of the platforms increases, the cable delivery from the power supply to the platforms increases, a large amount of cabling in a chassis may subsequently block cooling air passage or at least narrow down the already squeezed cooling air passage in the chassis.

There is, therefore, a need for improved techniques that power multiple platforms with a minimum impact on the air passage in a predefined environment (e.g., a chassis).

SUMMARY

This section is for the purpose of summarizing some aspects of embodiments of the present invention and to briefly introduce some preferred embodiments. Simplifications or omissions in this section as well as the title and the abstract of this disclosure may be made to avoid obscuring the purpose of the section, the title and the abstract. Such simplifications or omissions are not intended to limit the scope of the present invention.

Broadly speaking, the present invention pertains to method and system for powering multiple platforms with a minimum impact on air passage in a predefined environment, such as a chassis. Instead of connecting each of the platforms in a chassis to a power supply therein, the present invention uses what is referred to as cascading powering to power all platforms within minimum cable delivery. According to one embodiment of the present invention, each platform is provided with a pair of power connectors. At least one of the platforms has a power connector located towards or near a power supply so that only a short multi-pin cable is needed to power the platform. The power is serially provided to an adjacent platform via a pair of corresponding connectors, each located on one of the two adjacent platforms. Thus only a small cable is needed to connect the two connectors. Such configuration is extended to the remaining platforms. As a result, all platforms are cascaded and powered by the same power supply without using individual cables directly to the power supply.

According to another embodiment of the present invention, a redundant or secondary power supply is provided. By using the similar configuration to deliver the connection from all platforms to the secondary power supply, possible interruption due to the failure of the primary power supply could be minimized. At the same time, the cable delivery for the second power supply is also minimized.

The present invention may be implemented as a method and a system. According to one embodiment, the present invention is a method for power multiple platforms, the method comprises coupling a first one of the platforms to a power supply, wherein the first platform is physically close to the power supply, and powering remaining ones of the platforms by serially transforming connections from the power supply to the remaining ones of the platforms, wherein any two of the remaining ones of the platforms are connected by a power cable between two respective connectors, each located in one of the two of the remaining ones of the platforms, wherein the platforms and the power supply are enclosed in a predefined environment.

According to another embodiment, the present invention is a system for powering for powering multiple platforms, the system comprises a power supply, a plurality of the multiple platforms positioned adjacent to each other, a first one of the platforms is directly connected to the power supply, wherein any two of the platforms are connected by a power cable between two respective connectors, each located in one of the two of the platforms, and wherein all of the platforms are powered by the power supply with a minimum impact on air passage due to cable delivery in the system.

Depending on implementation, the system may be a chassis and further include a backup power supply to minimize possible interruption of the system due to the failure of the power supply. Thus all of the platforms are serially cascaded to the backup power supply.

Accordingly one of the objects of the present inventions is to provide improved techniques of powering multiple platforms in a predefined environment.

Other objects, features, and advantages of the present invention will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE PREFERRED EMBODIMENTS

The detailed description of the invention is presented largely in terms of procedures in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
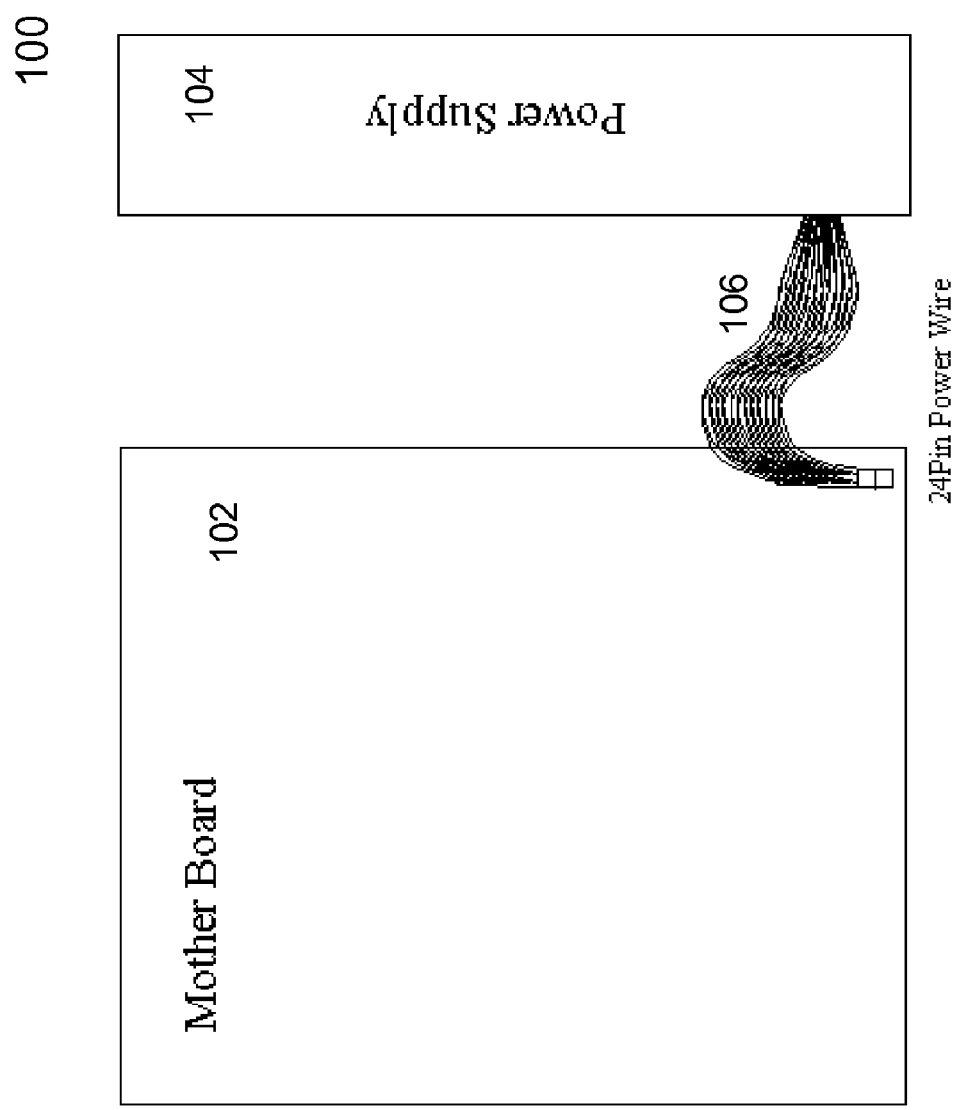
FIG. 1 shows an exemplary way commonly used to power a single platform in a chassis.
Figure 2:
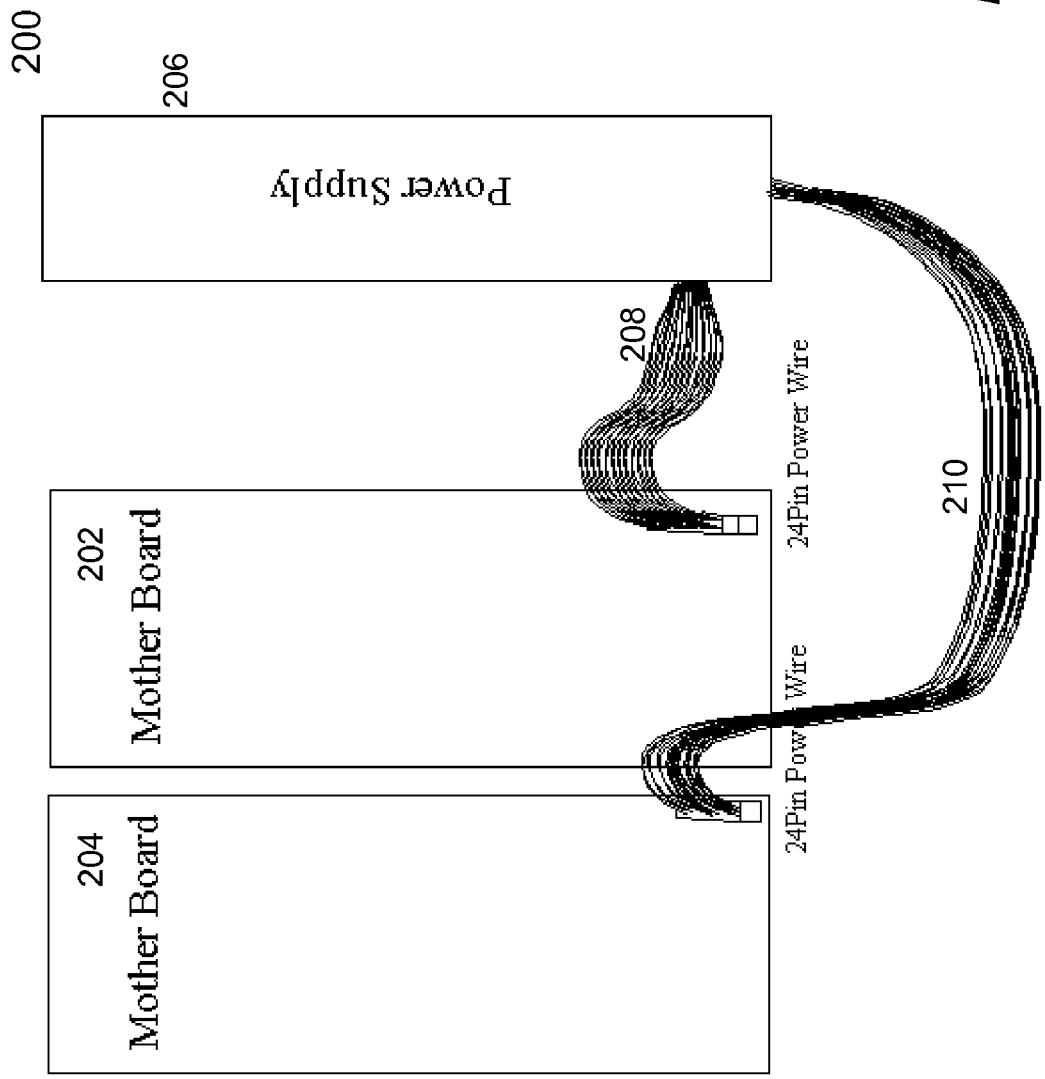
FIG. 2 shows an exemplary way commonly used to power two individual platforms in a chassis.
Figure 3:
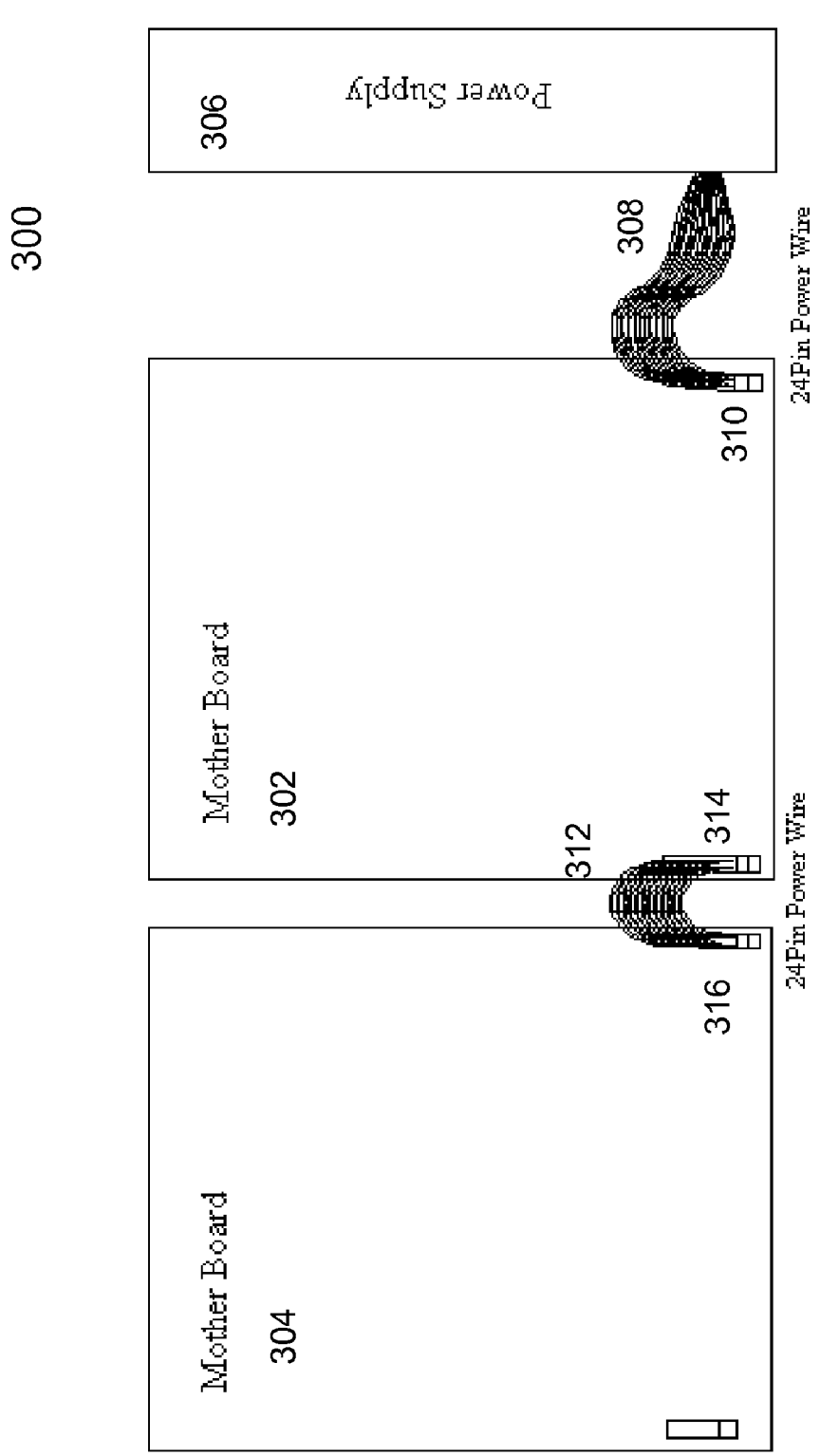
FIG. 3 shows an exemplary block diagram of powering two individual platforms according to one embodiment of the present invention.

Referring now to the drawings, in which like numerals refer to like parts throughout the several views. According to one embodiment of the present invention, FIG. 3 shows an exemplary block diagram of powering two individual mother boards 302 and 304. The first mother board 302 is powered directly by a 24-pin power cable from the power supply 306. The first mother board 302 is configured to include a pair of power connectors 310 and 314. As illustrated in the figure, the power connector 310 is used to be connected to the power supply 306. The first mother board 302 then passes the power and any control signals, if there are any, to the second mother board 304 via the connectors 314 and 316. Because the two corresponding connectors 314 and 316 are physically near to each other, the cable 312 connecting them shall be of small or short. Similarly, the cable 308 shall be of small or short.

In other words, when there are a number of computing platforms, these platforms are cascaded to be powered by a single power supply so as to reduce the wiring or cable delivery. Such cascading powering can reduce wiring of power delivery to multiple platforms in rack mountable chassis of 1 U, 2 U and up. Consequently, the cascading powering reduces the use of a lot of wires that otherwise would block (cooling) air passage in a predefined environment (e.g., a chassis).

Figure 4:
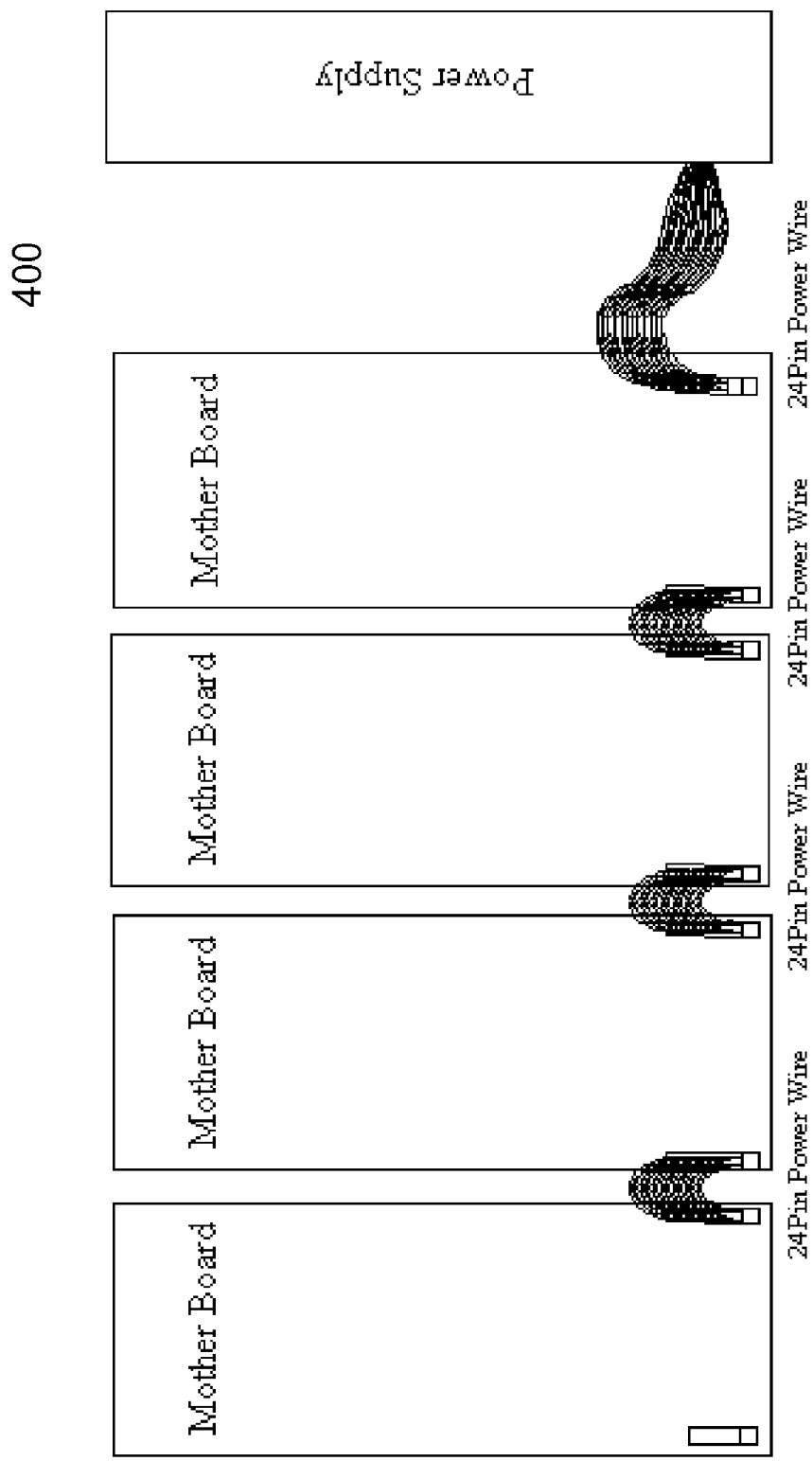
FIG. 4 shows a configuration of powering a number of computer boards by cascading.

FIG. 4 shows a configuration 400 of powering a number of boards by cascading. Because the wiring delivery happens only between two adjacent boards, the wiring itself would not significantly effect the air passage in a chassis. It can be appreciated that the cascading powering can be extended to many boards as long as the power supply is sufficient in power.

Figure 5:
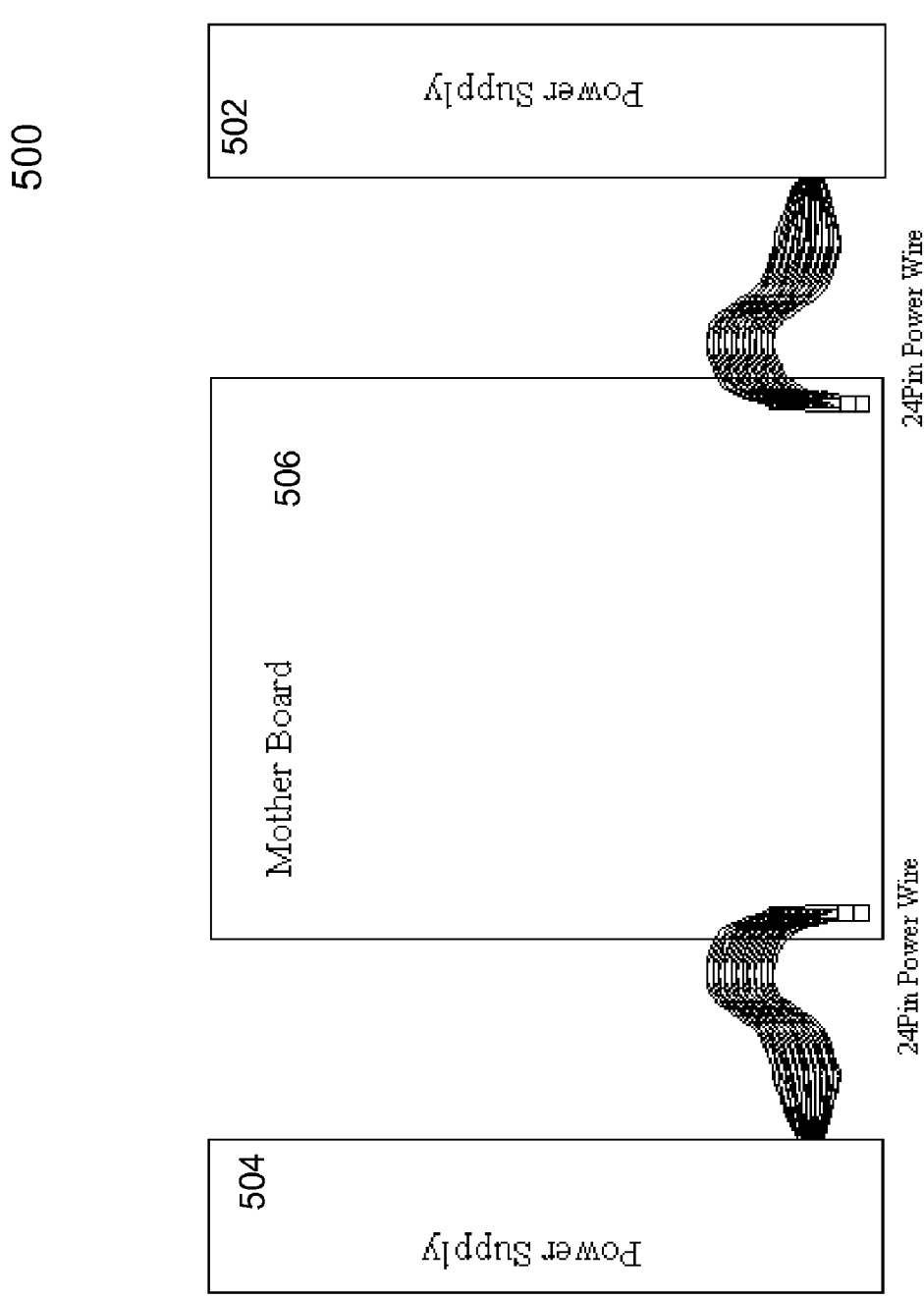
FIG. 5 shows a configuration of providing a backup power supply, such configuration being readily extended to one embodiment of the present invention, in which all platforms may be serially cascaded to be coupled to the backup power supply.

For redundant purpose of power supplies, according to one embodiment, a secondary or backup power supply is provided. Thus one platform may use two identical power connectors with two power supplies or either one of them. FIG. 5 shows a configuration 500 of providing two power supplies 502 and 504 to a mother board 506. In one embodiment, one of the two power supplies 502 and 504 is primary the other one is a secondary or backup. In the event that the primary one fails, the second one can be figured to automatically step in to continue the power supply.

To use the configuration illustrated in FIG. 5, in one embodiment, each of the platforms to be powered is equipped with two identical power connectors, each for being cascaded for one power supply to ensure the redundancy.

One of the features in the present invention is to power multiple platforms with minimized wiring delivery so as to reduce the blockage of air passage.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

I claim:

1. A method for powering multiple platforms, the method comprising:
   coupling a first one of the platforms to a power supply, wherein each of the platforms has a substantially similar physical layout regarding locations of an input power connector and an output power connector, the first one of the platform is physically closest to the power supply; and
   powering remaining ones of the platforms by serially transforming connections from the power supply to the remaining ones of the platforms, wherein any two adjacent platforms are connected by a power cable between the input and output power connectors, each located in one of the two adjacent platforms,
   wherein the power cable is designed to transform electricity in different voltages, and the platforms and the power supply are enclosed in a predefined environment.

2. The method as recited in claim 1, wherein the first one of the platforms includes a first connector and a second connector, the first connector being an input power connector used to be connected to the power supply with a short power cable, and the second connector being an output power connector used to be connected to a next adjacent one of the platforms.

3. The method as recited in claim 1, wherein each of the platforms includes at least a pair of connectors located oppositely, each of the connectors physically near an adjacent platform such that the power cable between two adjacent platforms is made short to minimize blockage of cooling effects within the predefined environment.

4. The method as recited in claim 3, wherein the two adjacent platforms are serially connected across the two respective connectors, as a result, all of the platforms are powered by the power supply with a minimum impact on air passage due to cable delivery in the predefined environment.

5. The method as recited in claim 4, wherein the predefined environment is a chassis.

6. The method as recited in claim 1, wherein the predefined environment further includes a backup power supply.

7. The method as recited in claim 6, further including serially connecting the platforms to the backup power supply.

8. The method as recited in claim 7, wherein said serially connecting the platforms to the backup power supply is achieved by:
   providing a pair of secondary input and output power connectors on each of the platforms, each of the input and output power connectors located oppositely, each of the input and output power connectors physically near an adjacent platform; and
   connecting the platforms serially through the secondary input and output power connectors and subsequently to the backup power supply.

9. A system for powering for powering multiple platforms, the system comprising:
   a power supply;
   a plurality of the multiple platforms positioned adjacent to each other, each of the platforms having a substantially similar layout regarding locations of an input power connector and an output power connector, wherein a first one of the platforms is directly connected to the power supply, any two of the platforms are adjacently connected by a power cable—between the input and output connectors, each of the input and output connectors disposed on one of the two of the platforms, and
   wherein the power cable is designed to transform electricity in different voltages, and all of the platforms are powered by the power supply with a minimum impact on air passage due to minimized cable delivery of the power cable in the system.

10. The system as recited in claim 9, wherein the system is a chassis.

11. The system as recited in claim 9, further including a backup power supply.

12. The system as recited in claim 11, wherein the platforms are serially connected to the backup power supply.

13. The system as recited in claim 9, wherein each of the platforms functions independently.

14. The system as recited in claim 13, wherein the system is a server system.

15. The system as recited in claim 9, wherein the platforms are serially connected to the backup power supply by operations of:
   providing a pair of secondary input and output power connectors on each of the platforms, each of the input and output power connectors located oppositely, each of the input and output power connectors physically near an adjacent platform; and
   connecting the platforms serially through the secondary input and output connectors and subsequently to the backup power supply.

* * * * *